April 21, 1953 — W. A. DOERING ET AL — 2,635,662
FRUIT TRANSPORT DEVICE FOR PITTING MACHINES
Filed July 11, 1949 — 5 Sheets-Sheet 2
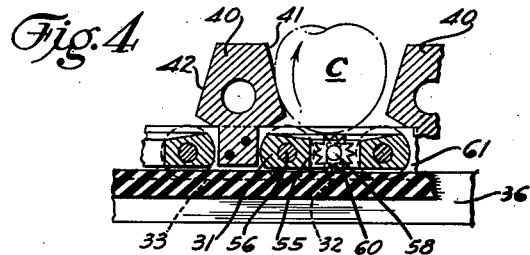
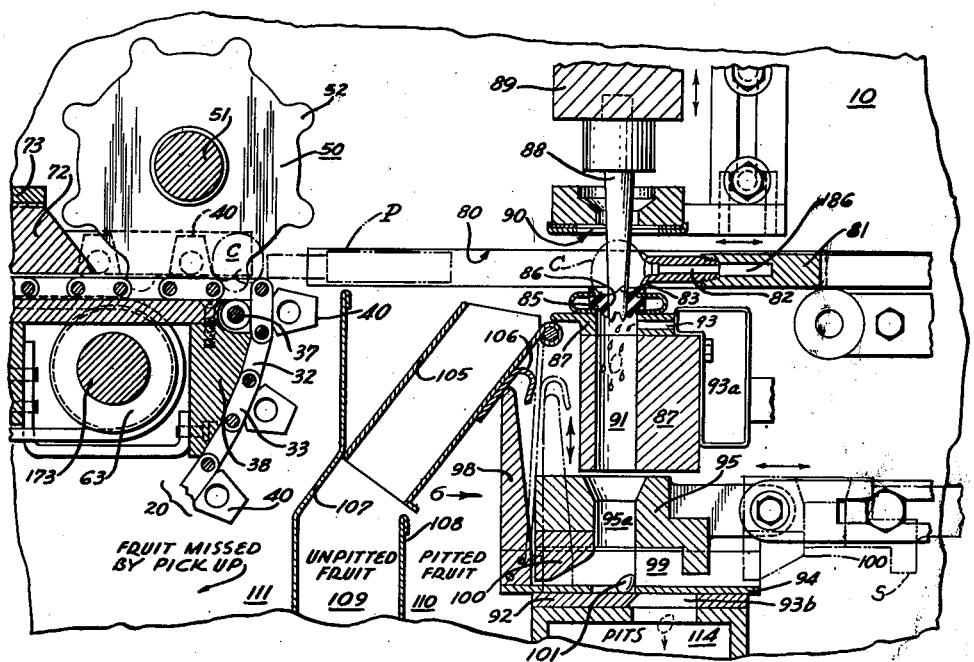
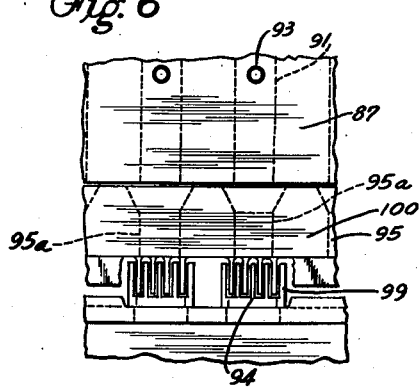
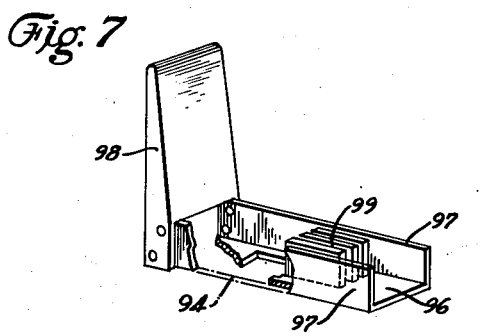
INVENTORS:
WILLIAM A. DOERING
WILLIAM E. KOENIG
BY Herbert E. Metcalf
Attorney April 21, 1953 W. A. DOERING ET AL 2,635,662
FRUIT TRANSPORT DEVICE FOR PITTING MACHINES
Filed July 11, 1949 5 Sheets-Sheet 3

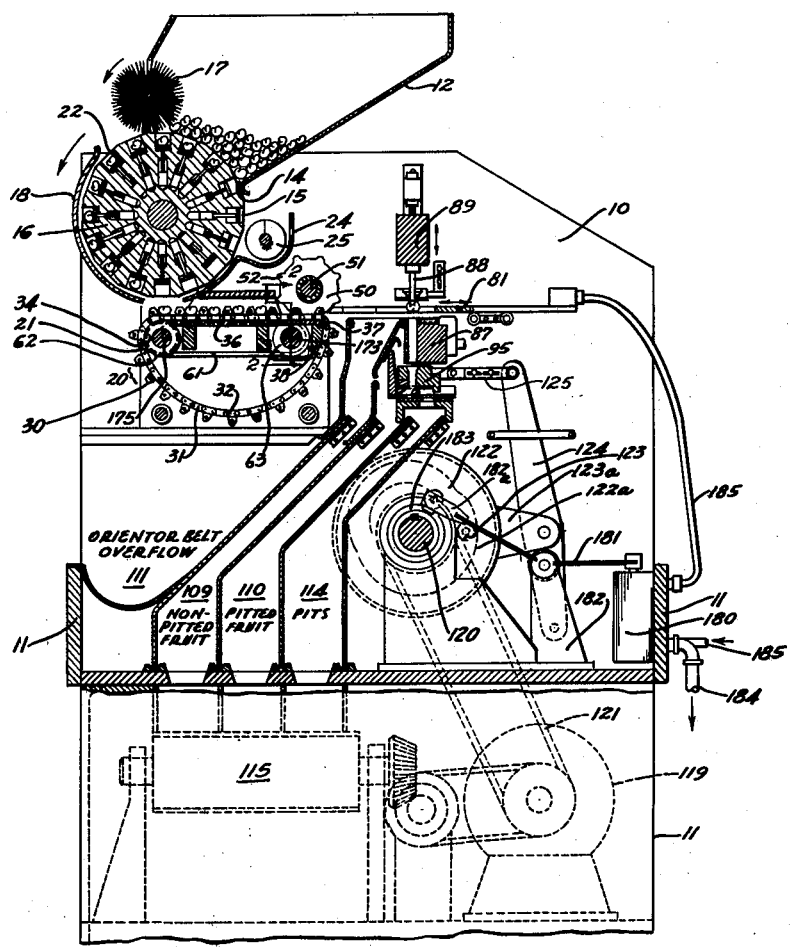
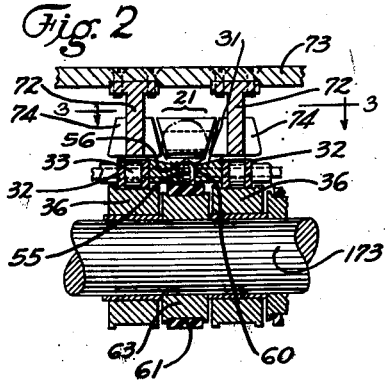
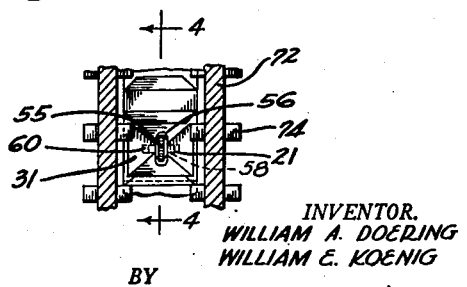

INVENTOR.
WILLIAM A. DOERING
WILLIAM E. KOENIG
BY
Herbert E. Metcalf
Attorney

April 21, 1953   W. A. DOERING ET AL   2,635,662
FRUIT TRANSPORT DEVICE FOR PITTING MACHINES
Filed July 11, 1949   5 Sheets-Sheet 4

INVENTOR.
WILLIAM A. DOERING
WILLIAM E. KOENIG
BY
Herbert E. Metcalf
Attorney

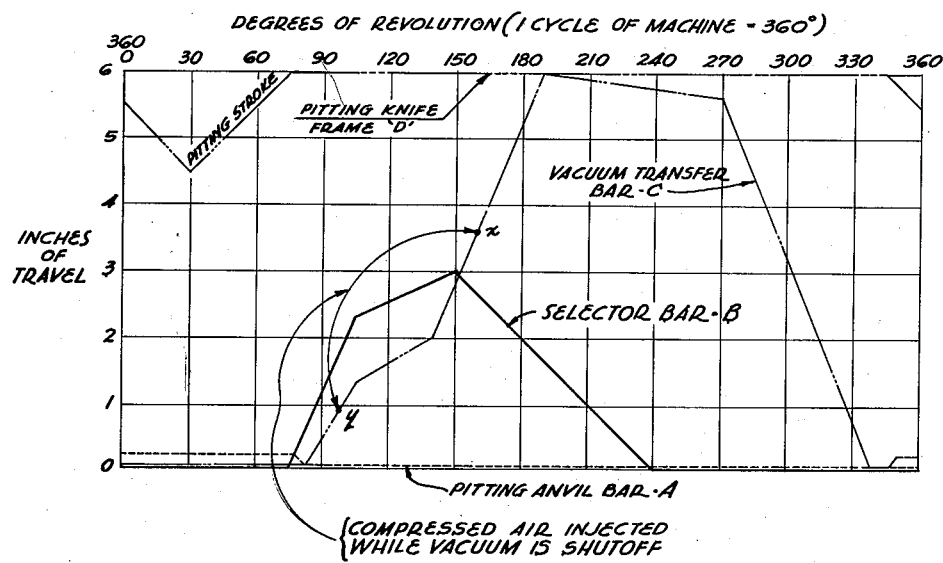

Patented Apr. 21, 1953

2,635,662

UNITED STATES PATENT OFFICE 2,635,662

FRUIT TRANSPORT DEVICE FOR PITTING MACHINES

William A. Doering, Palo Alto, and William E. Koenig, Redwood City, Calif., assignors to S & W Fine Foods, Inc., San Francisco, Calif., a corporation of California Application July 11, 1949, Serial No. 105,858

8 Claims. (Cl. 146—18)

1

The present invention relates to fruit transport devices, and more particularly to a fruit transport device that can pick up and transport a fruit in a predetermined position with respect to the stem indent thereof.

In the processing of indented fruit such as cherries, and particularly when the fruit is to be pitted, it is highly desirable that the fruit be orientated so that the pitting operation may take place with a definite relation to the fruit indent. In the case of cherries, it is desirable that the pitting knife enter the blossom end of the fruit to force the pit out of the cherry through the pit indent area. In this way a minimum amount of meat is removed with the pit and the shape and general appearance of the fruit remain natural.

Cherries and other indented fruit can be orientated with respect to the stem indent by rotating the fruit in contact with an orientation member which, when registry of this member with the stem indent occurs, enters the indent to a sufficient extent to act as a deterrent to further fruit rotation. By placing the orientation member in a predetermined position the fruit will stop rotating and will remain in a predetermined position so that it can be pitted as desired.

One of the most efficient orientation members of the above described type is a wheel upon which the indented fruit rests while rotating, as exemplified for example by the structure shown, described and claimed in the Carroll Patent No. 2,220,511, issued November 5, 1940. In cases where a wheel is used for fruit orientation, however, with the fruit resting to some extent on the wheel, the wheel will normally be in the way of a pitting knife moved to force the pit out of the fruit through the indent area. In consequence, either the wheel (or other bottom type orientation member when used) must be moved away from the fruit, or the fruit must be moved away from the orientation member by a transport device that will pick up the orientated fruit, move it to a pitting location and maintain it in orientated position during the pitting operation. The structure of applicant's specific orienting means constitutes the subject matter of Patent No. 2,609,913.

Among the objects of the present invention are:

To provide a simple means and method of transporting fruit in a predetermined position;

To provide a fruit transport device that will pick up, transport, and hold a fruit in a predetermined position;

2

To provide a fruit transport device that will operate between a fruit orientation device and a fruit pitting device to transport the fruit from one device to the other without disturbing the position of the fruit;

To provide a fruit transport device that can hold fruit in a predetermined position while being transported, without encompassing or gripping the fruit;

To provide a fruit transport device that will pick up a fruit without substantial position change of said fruit;

To provide a fruit transport device that can pick up and remove fruit from a continuously moving carrier;

To provide a means and method of holding fruit in a predetermined position during pitting;

And to provide a rapid and efficient means and method of transporting fruit.

In broad terms, the invention comprises a member that is oscillated over a path between two end positions. This member has an apertured vertical face, and means are provided for creating a suction at this aperture. Means are also provided to present fruit to the vertical face of the member at one of the two end positions so that the fruit will become attached thereto by the suction. The fruit is then transported, while so attached, to the other of the two end positions where the fruit is operated on by a fruit pitting device. After this operation and while the member is on the way back to the original end position thereof, means are provided to terminate the suction so that the fruit will drop off the member before a new fruit is picked up. In certain cases it may be desirable to substitute positive pressure for the negative pressure to insure fruit removal. In either case, suction is reestablished before a new fruit is presented to the member.

The present invention will be more fully understood by reference to the drawings, in which:

Figure 1 is a view partly in section and partly in elevation of a fruit orientating machine embodying a preferred form of the present invention.

Figure 2 is a cross-sectional view of a carrier taken as indicated by line 2—2 in Figure 1.

Figure 3 is a top view taken as indicated by line 3—3 in Figure 2.

Figure 4 is a longitudinal sectional view taken as indicated by line 4—4 in Figure 3, and rotated 90 degrees clockwise.

Figure 5 is an enlarged longitudinal sectional view of a preferred transfer and pitting mechanism used in the machine shown in Figure 1.

Figure 6 is a front end view taken as indicated by arrow 6 in Figure 5.

Figure 7 is a perspective view of a selector block used in the device of Figure 5.

Figure 11 is a timing chart applicable for the operation of the machine of Figure 1.

Figure 10:
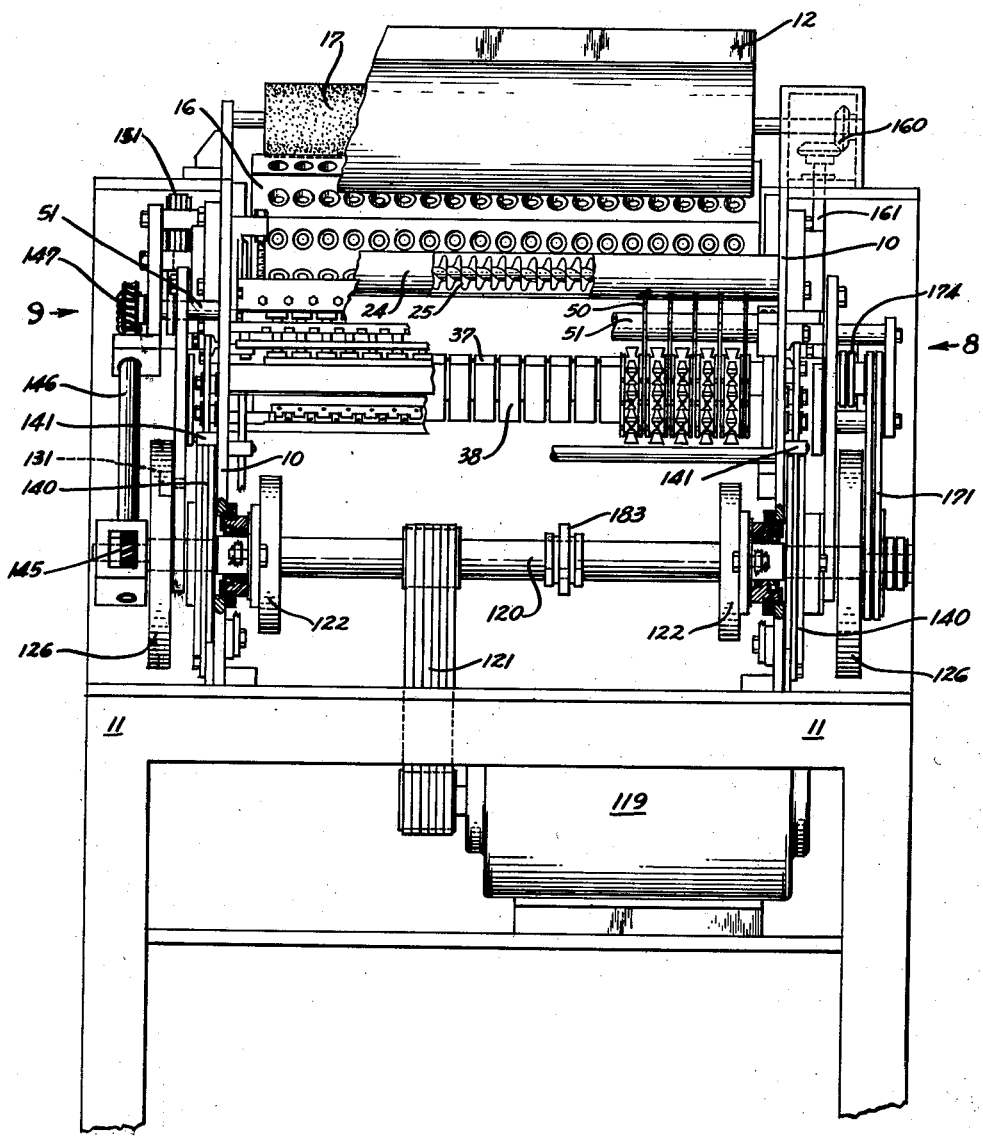
Figure 10 is a front end view of the machine of Figure 1, parts being broken away for clarity.

Referring first to Figures 1 and 10, the main structural support of the machine is a pair of spaced upright steel plates 10 mounted on a subframe 11. If only a few parallel orientation rows are to be utilized only a single plate need be used. However, if a larger number of rows are to be utilized, as in the machine illustrated, then a plate 10 is used on each side.

Fruit, such as cherries, to be orientated, are placed in a hopper 12 mounted on top of the side plates 10 and pass through lower hopper opening 14 to fall into fruit receptacles 15 on the periphery of a feed drum 16 rotated counterclockwise, as shown in Figure 1. A brush 17 mounted above drum 16 is also rotated counterclockwise, and bears against the periphery of drum 16 as it rotates, and prevents fruit other than a single fruit in receptacles 15 from being carried around the drum.

A stationary drum shell 18 is positioned around the drum 16 as the fruit is moved downwardly in receptacles 15, this shell terminating just above a conveyor 20 so that fruit in the receptacles 15 will drop into fruit receiving recesses 21 formed by separate parts of the conveyor. In order that fruit that might not drop out of the drum receptacles 15 be removed before the receptacle arrives back at hopper opening 14, each receptacle is provided with an ejector piston 22 that is moved outwardly by a cam (not shown) to force fruit into a screw conveyor trough 24 from which these fruits are removed laterally by a screw conveyor 25. This construction is particularly valuable when processing cherries, as twin fruits are apt to become forced into the receptacles 15 by the action of brush 17 and thus do not readily drop out of receptacles 15 at the end of drum shell 18.

Each conveyor 20 comprises an endless link type chain 30. Base blocks 31 (best shown in Figures 2 and 3) are rotatively connected to adjacent base links 32, these latter links being connected by cross bar links 33. In the multiple carrier machine one cross bar link connects two base links.

At a point just below the termination of drum shell 18 each chain 30 passes upwardly over an idling sprocket 34 (Figure 1) and then onto a pair of spaced, horizontal slide bars 36 bearing on the bottoms of base blocks 31, as shown in Figures 2 and 5. Each chain 30 runs a short distance horizontally over slide bars 36 and then breaks sharply around small rollers 37 to cause an abrupt downward shift of chain path. After passing over roller 37 each chain passes over a guide plate 38, and then drops by gravity until it rises to pass again around idling sprocket 34.

Cross bar links 33 are bridged by vertically extending cross bars 40 having front and rear flat, sloping surfaces 41 and 42 respectively, these cross bars extending at right angles to the conveyor path. Thus the cross bars each form the front of one recess and the rear of the preceding recess.

Each conveyor chain 30 is progressed by an overhead drive gear 50 mounted on gear shaft 51 extending through the side plates 10, the teeth 52 on gears 50 meshing with chains 30 between exterior links 32.

Referring to Figures 2, 3, and 4, as the conveyor 20 is progressed, orientation of the fruit in the composite recesses is accomplished by a wheel 55 having a serrated edge positioned in each base block 31, to have the wheel periphery extend above the bottom level of the associated recess, the wheel entering the recess through slot 56 in a base block 31. Wheel 55 is mounted on a floating shaft 58, this shaft being free to move vertically in a shaft slot 60. The lower periphery of the wheel 55 extends below the level of the base block 31 through slot 56 to contact a driving belt 61, best shown in Figure 4.

Belts 61 are mounted on fore and aft pulleys 62 and 63, respectively, and extend from the fruit loading position to a point just below drive gear 50 so that belts 61 contact all wheels in all recesses that are on the slide bars 36, except the recesses that are about to pass around roller 37.

As the orientation recesses 21 pass over the slide bars 36 the wheels 55 are rotated by the moving belt, preferably counterclockwise, so that the thrust of the rotating fruit C is taken by the front surface 41 of each cross bar, thereby placing the cherry C rearwardly in each recess, as shown in Figure 4.

As stated above, as each recess reaches a roller 37, the chains 30 start abruptly downward as shown best in Figure 5. This abrupt change in chain angle places the cross bar of the recess that has passed around the apex of the guide plate 38 completely below and away from the remainder of the following recess, while the base block of this latter recess is still horizontal. This horizontal position is the fruit removal position of each recess, and if desired the teeth 52 of driving gear 50 can be spaced to permit the recess to have a slight dwell in this position for fruit removal, although a pronounced intermittent motion is not necessary, and a continuous drive is permissible.

Certain types of cherries may have a relatively high percentage of fruit that are elongated along the indent-tip axis. These fruit tend to assume a more or less stable position while being rotated by the wheel 55 with the indent-tip axis at a right angle to the plane of the wheel. When this happens the fruit is not generally orientated properly in the time allotted for orientation. Consequently, it may be desirable to provide means associated with the recesses to turn elongated fruit that is rotating in the above described manner so that elongated fruit can be properly orientated within the allotted time. This can be accomplished by providing relative movement between the sides of the recesses and the remainder of the recesses. The cross bars 40 do not have recess sides attached to them. Instead, the recess sides are stationary side bars 72 extended downwardly from a side bar frame 73 positioned above the conveyor, as best shown in Figures 2 and 3. Each stationary side bar 72 is provided with laterally extending turning ribs 74, the inner surfaces of these ribs being sloped, the side bars 72 not being sloped between the ribs. Ribs 74 are oppositely spaced to define sides of the recess normally permitting a cherry to pass through unobstructed if spherical but to touch and turn an elongated cherry when rotating on the wheel with the indent-tip axis crosswise in the recess. The turning action of the ribs 74 thus disturbs the stable position of the cherry so that it is more readily orientated when elongated, and this type of a conveyor, with only wheel-carrying base blocks 31 and the cross bars 40 being progressed between stationary sides, has been found to very materially increase the orientation percentage of elongated fruit therein.

It should, however, be pointed out that side bars 72 do not necessarily have to be stationary. They can be moved or oscillated along the conveyor line if desired. It is desirable only that relative motion be achieved between the conveyor and the side bars 72 in order that a high percentage of orientation be obtained with elongated fruit.

In accordance with the present invention, a fruit transport and pitting mechanism suitable for handling fruit orientated by the device so far described is shown in Figures 1 and 5, best shown in Figure 5. Each side plate 10 is provided with a horizontal slot 80 in which a transfer bar 81 is reciprocated. The slot 80 extends from a point near the position of a recess opened for fruit transport, to a pitting station, and transfer bar 81 carries a hollow vacuum pick-up tube 82 extending toward the conveyor 20 and terminating in a flared end 83 facing the opening recess 21. Transfer bar 81 is movable along slot 80 to place flared end 83 of pickup tube 82 in a position where it will closely approach or contact the side of a fruit resting in the opened recess during its slight dwell in this position. This position is indicated by the broken line P in Figure 5. At this point vacuum is applied to tube 82 and the fruit is attached by suction to the flared end 83 of pickup tube 82. Transfer bar 81 then moves to the opposite end of its stroke in slot 80 to place the fruit over a pitting rubber 85 having a central pit aperture 86 therein, this rubber being held on an anvil bar 87. A pitting knife 88 is reciprocated vertically, being held in knife frame 89, this knife passing through a stripper plate 90, then through the fruit to force the pit of the fruit through the aperture 86 in rubber 85 to pass through a pit duct 91 in pitting frame 87 to land on a pit plate 92, aided in passage by water from pipe 93 connected to manifold 93a.

Pit plate 92 is provided with a forward pit discharge opening 93b normally covered by the bottom of a selector slide 94 reciprocable in a horizontal plane.

The selector slide 94 (as shown in Figure 7) comprises an apertured bottom 96, sides 97, upright gate actuator arm 98, and a female comb 99 and slides freely over pit plate 92, being moved directly toward the conveyor by male comb 100 attached to selector bar 95 contacting upright gate actuator arm 98. Selector bar 95 is reciprocated in a horizontal plane by a mechanism yet to be described, and has a pit passage 95a therein forming a continuation of pit duct 91. Selector slide 94 can be moved away from the conveyor only by a pit 101 resting on pit plate 92 being caught between the male and female combs 100 and 99 on the return stroke of the selector bar 95. Thus, whether or not the selector slide 94 will move away from the conveyor depends upon whether or not there is a pit resting on pit plate 92.

The upright gate actuator arm 98 on the selector slide 94 extends upwardly to contact the bottom of an angularly disposed gate 106 hinged at its upper edge and sloping downwardly, this contact being made inside of hook 106 mounted on gate 105. With the selector slide 94 in its forward position, i. e., toward the conveyor, the gate 105 forms a path between a fixed front channel plate 107 and a fixed rear channel plate 108 into an unpitted fruit chute 109. When the selector slide 94 is moved to the rear by a pit 101, being caught between combs 99 and 100, gate 105 swings downwardly to open a path into a pitted fruit chute 110 at the rear of rear channel plate 108. Front channel plate 107 is spaced from the conveyor a sufficient distance so that fruit not picked up by pickup tube 82 will fall in front of a front channel plate 107 into a chute 111 for unpicked-up fruit.

Male comb 100 connected to selector bar 95 is sloped rearwardly and upwardly, so that on the rearward stroke of selector bar 95 (shown by broken line S in rear position), the pit is forced downwardly through the pit discharge opening 93b in pit plate 92 to fall into a pit chute 114. The unpitted fruit, the pitted fruit, and the pits fall on separate portions of an output conveyor 115 through their respective chutes, as shown in Figure 1.

The output is conveyed laterally, separately collected, and disposed of in a manner in keeping with the character of the collected material.

Clearance for fruit transported by the pickup tube 82 from the opened recess at the transport position, and for unobstructed deposit on the pitting rubber, is provided. It will be noted, as pointed out above, that just before the recess to be opened reaches the transport position, the belt drive for the wheel 55 ceases, due to the belt 61 passing around the rear pulley 63. When this happens, the wheel 55, being free to drop under the urge of gravity, does so, so that when the fruit is moved along the bottom of the recess, the wheel is no longer projecting above the bottom. This action of the wheel 55 prevents the fruit from being rocked off the flared end 83 of the pickup tube 82 as it starts moving away from the opened recess.

Similarly, as the pitting rubber 85 is concave, it is desirable to lower the rubber as the fruit approaches, the rubber, and then raise the rubber as the cherry is directly over it, at the rear of the pickup tube travel. This is accomplished by reciprocating the anvil bar 87 vertically in timed relation to the stroke of the transport bar 81 by a sufficient distance so that the fruit will be transported without interference from rubber 85, and yet will be formally seated on the rubber when the pitting knife 88 passes downwardly through the fruit to pit the fruit.

The driving mechanism for a multiple row machine is shown in Figures 1, 8, 9, and 10. Referring first to Figure 10, a motor 119, preferably having a built-in gear reduction unit, is positioned on subframe 11 and drives a main shaft 120 through a multiple belt 121. Main shaft 120 extends through both side plates 10 below the pitting mechanism, and is used to drive cams positioned adjacent both side plates.

As shown in Figure 1, mounted on main shaft 120 just inside of plates 10, is a selector cam 122 having a selector cam follower 123 mounted on a follower arm 123a extending horizontally to be attached to a generally vertical selector lever 124. Follower 123 rides in cam groove 122a.

The top of selector lever 124 is attached to selector bar 95 by an adjustable link 125. Thus, the selector bar is reciprocated to provide selection and segregation of the pitted cherries, by directing the pitted fruit into the pitted fruit chute 110.

Mounted just outside of each side plate 10 on main shaft 120 is a composite cam 126 (Figures 8 and 9) in one groove 126a of which a horizontal transfer follower 127 operates, the latter being attached to a horizontal follower arm 126b operating a vacuum transfer lever 128, the top of which is adjustably connected through transfer link 129, to the vacuum transfer bar 81, operating in slot 80 in the side plates 10, so that the pickup tubes 82 are reciprocated to transfer the fruit from the opened recess to the pitting rubber 85.

On composite cams 126, just outside of each vacuum transfer groove 126a, a pitting cam groove 130 has a pitting cam follower 131 bearing thereagainst attached to an upright pitting link 131a, the upper ends of which are attached to pitter bar 89 to which knife frame 89 is fastened. Thus, the pitting knives are reciprocated.

Figure 8:
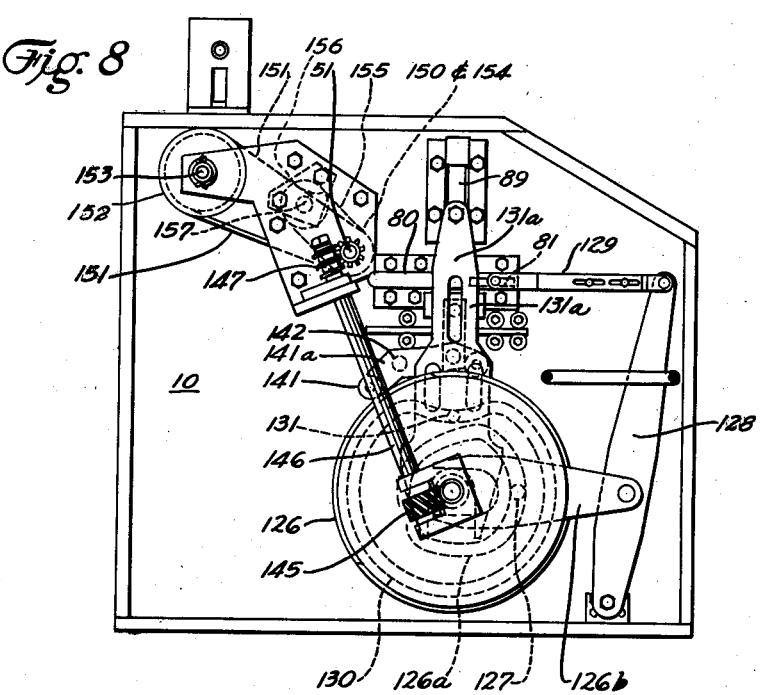
Figure 8 is a side view taken of the near side of the machine of Figure 1.
Figure 9:
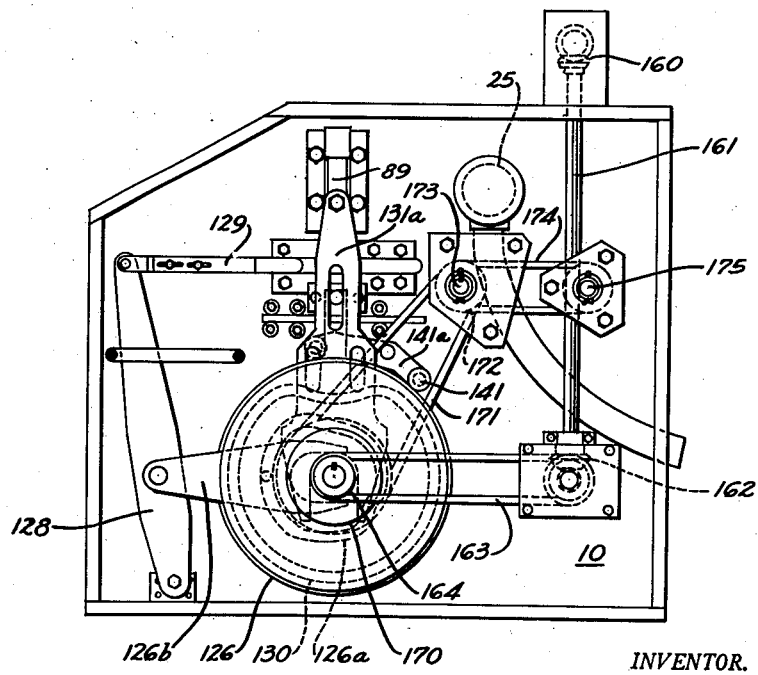
Figure 9 is a side view taken of the far side of the machine of Figure 1.

Between each composite cam 126 and plates 10 is an anvil bar cam 140 (Figure 10), the peripheries of which are contoured to an anvil bar follower 141 (Figures 8 and 9). Anvil bar follower 141 is attached to a generally horizontal follower arm 141a, medially pivoted on a follower pivot 142, with one end attached to anvil bar 87 through plates 10. Thus, the anvil bar 87 is raised and lowered as fruit transfer is taking place.

Preferably on one side plate 10 only, as shown in Figure 8, the outer end of main shaft 120 is provided with lower worm gears 145 driving a rising worm shaft 146 terminating in upper worm gears 147 driving the gear shaft 51 to which orientator conveyor drive gears 50 are attached. Orientator gear shaft 51 is also provided on one side only (see Figure 8) with a drum drive pulley 150 connected by drum drive belt 151 to a drum shaft pulley 152 mounted on a drum shaft 153 on which feed drum 16 is mounted (see Figures 1 and 5).

Alongside of drum drive pulley 150 is a screw conveyor drive pulley 154 which, through a screw conveyor belt 155, drives a screw conveyor driven pulley 156 attached to a screw conveyor shaft 157 on which screw conveyor 25 is rotated in trough 24 (see Figure 1).

On the opposite side plate 10 (see Figure 9) brush 17 is rotated by upper brush gears 160, brush shaft 161 and lower brush gears 162, the latter being rotated by a brush belt 163 passing over main shaft brush pulley 164.

The wheel drive belts 61 are rotated by a large wheel drive pulley 170 on the outer end of main shaft 120, a wheel drive main belt 171 passing around the large wheel drive pulley 170 and then around a small wheel drive pulley 172 mounted on a wheel belt shaft 173 on which are mounted the rear wheel belt pulleys 63 which progress the wheel belts 61. Front wheel belt pulleys 62 are rotated by cross belt 174 rotating front pulley shaft 175 (see Figure 9).

As best shown in Figure 1 the vacuum for the pickup tubes 82 is under the control of a vacuum valve 180 operated by one end of a valve lever 181 pivoted on a lever bracket 182. The other end of valve lever 181 is a lever follower 182 bearing on a lever cam 183 mounted on main shaft 120. Valve 180 is connected to a vacuum pump (not shown) by vacuum line 184, and to a source of compressed air (not shown) by air line 185. The outlet of the valve is connected to a flexible hose 185 connected to a manifold 186 inside the vacuum transfer bar 81, as shown in Figure 5, to which the interior of the pickup tubes 82 are connected. The valve, when the main shaft 120 is rotated, thus causes alternate reduction and increase in pressure to take place in the transfer bar manifold 186. The vacuum pump is to have sufficient capacity to have one pickup tube 82 pick up a cherry even though all other pickup tubes are open to the atmosphere.

In the operation of the machine, the motor 119 is started and fruit such as cherries to be pitted are placed in hopper 12 from which the cherries pass individually into the receptacles 15 in the rotating drum 16. Brush 17 insures that only one fruit is in each aperture and that no fruit is jammed between drum 16 and the stationary drum shell 18. The fruit is then carried downwardly by the receptacles 16 to drop into each fruit receiving recess 21 as it arrives at the beginning of the horizontal path of the conveyor. The composite recesses move over the wheel drive belt 61 as the conveyor progresses, the wheels 35 rotate, and the cherries are rotated in the recesses until the stem indent fits over the wheel and ceases to rotate or until each wheel drops out of the recess as the wheels pass off from the belt just prior to the transfer position.

At the transfer position the cross bar 40 adjacent the sharp bend in the conveyor path passes around this bend, leaving the remainder of the recess undisturbed with the majority of the cherries resting in properly orientated position on the base blocks 31.

At this time, the flared end 83 of the pickup tube 82 is presented to the side of the cherry, this end moving to a position where it will closely approach or contact the side of a cherry. If the tube touches the cherry, the suction attaches the cherry to the pickup tube. Even if the end of this tube only closely approaches the side of the cherry without touching it, the air rushing into the tube causes the cherry to move slightly to attach itself to the tube. The cherry is then withdrawn from the recess, if picked up, and transported on the end of tube 82 to the pitting mechanism. If not picked up, the fruit is carried around the bend and falls by gravity into the non-pickup chute 111. The progression of the opened recess around the bend opens the next recess and the pickup cycle is repeated.

As the cherry approaches the pitting mechanism on the end of pickup tube 82, the anvil bar 87 drops to permit passage of the cherry, then rises beneath it to seat the cherry on the pitting rubber 85 as the pit is forced out of the cherry and through the hole in the pitting rubber to land on the pit plate 92 aided by water from manifold 93a. The selector slide 94 then operates to control the position of gate 105 so that after the pitting knife 88 clears the fruit on the upward stroke, and the pickup tube 82 starts toward the conveyor again the cherry is pushed and blown by compressed air off the anvil bar 87 and pickup tube 82 to fall into which ever chute the gate 105 has left open, according to whether or not the pit has been removed from the cherry being discharged.

However, all of the moving parts of the machine must be properly timed in order that the proper sequence of operation be obtained. One timing sequence found satisfactory is shown in the chart of Figure 11.

Here the cycle is shown of one complete revolution (0–360°) of the main shaft 120 and its associated cams in terms of inches of travel. The cycle has been shown to start just prior to pitting, with the anvil bar 87 up, as shown by line A on the chart; with the selector bar 95 stationary, as shown by line B on the chart; with the vacuum transfer bar 81 stationary as indicated by line C; and with the pitting knife 88 moving downwardly as shown by line D.

The vacuum valve 180 is providing maximum negative pressure (suction) at all times except between points x and y on line c, where compressed air is injected into tubes 82 through valve 180.

As the cycle proceeds, the pitting knife 88 reaches its full downward stroke at about 30° and starts back upwardly to become stationary at about 75°. Just prior to this point, at about 70°, the selector bar 95 starts moving, and the anvil bar 87 drops. As the anvil bar drops, the vacuum transfer bar 81 moves the pitted cherry back toward the conveyor and pushes it off the pitting rubber 85 and anvil bar 87. At the same time suction is shut off and as the cherry is moved toward gate 105 it is blown off the end of pickup tube 82. In the meantime, the selector bar 95 has moved sufficiently to position gate 105 in accordance with the presence or absence of a pit on pit plate 92. Thus, the cherry is properly segregated in accordance with the result of the action of the pitting knife.

The vacuum transfer bar 81 then continues to move toward the conveyor, and the selector bar 95 moves back to discharge the pit, if present, into pit chute 114. The selector bar then remains stationary until the next cycle. At 160° vacuum is reestablished in the pickup tubes 82.

At about 190, the vacuum transfer bar 81 reaches the conveyor end of its stroke, and pickup tube 82 is inserted into the opened fruit orientation recess now at the end of the horizontal path of the conveyor, to pick up a cherry in the recess. The direction of the vacuum transfer bar then reverses and the bar starts back toward the anvil bar 87 at the same speed as the recess is being progressed by the carrier. During this synchronous travel the cherry sticks to the flared end 83 of the pickup tube. The motion of the transfer bar 81 is then speeded up to transport the cherry to a point just above the pitting rubber 85, stopping there at about 338°. The anvil bar 87 then immediately rises under the fruit, and the pitting knife 88 starts down at about 345°. The cycle is then repeated.

Thus, each part is connected to give its proper motion when the main shaft is rotated. In one particular embodiment of the device found practical and highly satisfactory for the orientation and pitting of cherries, the stroke of the vacuum transfer bar 81 is six inches horizontally, the pitting knife 88 has a 1½ inch vertical stroke, the anvil bar 87 a vertical stroke of 5/32 inch, and the selector bar 95 is given a horizontal stroke of three inches, all as indicated in Figure 11.

Thus, with 48 R. P. M. of the main shaft, in one particular embodiment, for example, 48 cherries can be pitted per minute in each carrier row, and with 20 carrier rows, 960 cherries per minute is the complete output. Higher speeds are possible if the fruit is fully graded.

The percentage of orientation in the machine described is high, and the fruit is sorted into four groups: non-loading fruit, mostly twins, from the drum ejectors; fruit not picked up by the transfer mechanism; unpitted fruit, and the desired properly pitted fruit. The overall percentage of the latter will, of course, depend upon the quality of the fruit being processed but can be counted on to contain a very high percentage (well over 90%) of all the fruit physically suitable for proper loading, orientation and pitting. Many runs have been made averaging over 95% overall orientated and pitted cherries.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is, therefore, claimed in any of its forms or modifications within the legitimate and valid scope of the appended claims.

What is claimed is:

1. Means for transporting a fruit comprising a carrier adapted to be progressed along a horizontal path, a plurality of walls forming fruit recesses mounted on said carrier, means operating to orient fruit in said recesses, while said recesses are on said horizontal path, means for opening the forward wall of each of said recesses as each recess reaches a predetermined position on said path, a fruit contacting member having an aperture therein, means for reciprocating said member over a horizontal path in alignment with said first mentioned horizontal path to place the edges of said aperture in contact with the forward surface of a fruit in an opened recess at one end of the stroke of said member, and means for producing suction at said aperture to attach said fruit to said member.

2. Means for transporting a fruit comprising a carrier adapted to be progressed along a horizontal path, a plurality of walls forming fruit recesses mounted on said carrier, means operating to orientate fruit in said recesses, while said recesses are on said horizontal path, means for opening the forward wall of each of said recesses as each recess reaches a predetermined position on said path, a fruit contacting member having an aperture therein, means for reciprocating said member over a horizontal path in alignment with said first mentioned horizontal path to place the edges of said aperture in contact with the forward surface of a fruit in an opened recess at one end of the stroke of said member, means for producing suction at said aperture to attach said fruit to said member, and means for timing the reciprocation of said member to present said aperture to each fruit as said recess walls are opened.

3. Means for transporting a fruit comprising a carrier adapted to be progressed along a horizontal path, a plurality of walls forming fruit recesses mounted on said carrier, means operating to orientate fruit in said recesses, while said recesses are on said horizontal path, means for opening the forward wall of each of said recesses as each recess reaches a predetermined position on said path, a fruit contacting member having an aperture therein, means for reciprocating said member over a horizontal path in alignment with said first mentioned horizontal path to place the edges of said aperture in contact with the forward surface of a fruit in an opened recess at one end of the stroke of said member, means for producing suction at said aperture to attach said fruit to said member, means for timing the reciprocation of said member to present said aperture to each fruit as said recess walls are opened, and means for removing one fruit from said aperture before said aperture is presented to a succeeding fruit.

4. Means for transporting a fruit comprising a carrier adapted to be progressed along a horizontal path, a plurality of walls forming fruit recesses mounted on said carrier, means operating to orientate fruit in said recesses, while said recesses are on said horizontal path, means for opening the forward wall of each of said recesses as each recess reaches a predetermined position on said path, a fruit contacting member having an aperture therein, means for reciprocating said member over a horizontal path in alignment with said first mentioned horizontal path to place the edges of said aperture in contact with the forward surface of a fruit in an opened recess at one end of the stroke of said member, means for producing suction at said aperture to attach said fruit to said member, means for timing the reciprocation of said member to present said aperture to each fruit as said recess walls are opened, means for pitting a fruit while still attached to said member by said suction at the other end of the stroke thereof, and a fruit supporting element, means connected to move said fruit supporting element upwardly to a position beneath a fruit immediately prior to operation of said pitting means, and to move said fruit supporting element downwardly away from said fruit after operation of said pitting means, said fruit supporting element having a concave upper surface, the movement of said element being sufficient to clear said fruit during horizontal movement thereof by said member, means for substituting positive pressure for said suction after said fruit has been pitted.

5. Means for transporting a fruit for pitting comprising a fruit support having a concave upper surface with a pitting aperture therein, a fruit pitting knife, means for moving said knife toward said support to force a pit from a fruit on said support through said pitting aperture, a fruit transfer member, means for reciprocating said transfer member horizontally between two points, said member having a vertical face thereon including a suction inlet, means for producing suction at said inlet when said member is adjacent one of said points, means for placing fruit in a position to be picked up by the suction of said inlet for attachment to said member, the other of said points placing said fruit directly over and substantially in contact with said pitting aperture, and means for moving said fruit support upwardly immediately prior to the operation of said pitting knife, and for moving said support downwardly after operation of said pitting knife.

6. Means for transporting a fruit comprising a plurality of walls forming a fruit recess means operating to orientate fruit in said recesses, means for opening a wall of said recess, a fruit contacting member having an aperture therein, means for reciprocating said member over a horizontal path and through the opening in said opened wall to place the edges of said aperture in contact with a lateral surface of a fruit in the opened recess at one end of the stroke of said member, and means for producing suction at said aperture to attach said fruit to said member.

7. Means for transporting a fruit comprising a plurality of walls forming a fruit recess, means operating to orientate fruit in said recess, means for opening the forward wall of said recess at a predetermined time, a fruit contacting member having an aperture therein, means for reciprocating said member over a horizontal path and through the opening in said opened wall to place the edges of said aperture in contact with a lateral surface of a fruit in the opened recess at one end of the stroke of said member, means for producing suction at said aperture to attach said fruit to said member, and means for timing the reciprocation of said member to present said aperture to said fruit as said recess wall is opened.

8. Apparatus in accordance with claim 4 wherein said fruit supporting element is a receptacle of resilient material having said concave upper surface thereon, together with a central aperture in line with the movement of said pitting means, whereby during operation of said pitting means the pit of a fruit is forced through said central aperture.

WILLIAM A. DOERING.
WILLIAM E. KOENIG.

References Cited in the file of this patent

UNITED STATES PATENTS

| Number | Name | Date |
|---|---|---|
| 807,541 | Cunningham | Dec. 19, 1905 |
| 1,304,892 | Leefeld | May 27, 1919 |
| 1,498,078 | Duncan | June 17, 1924 |
| 1,904,720 | Douglass | Apr. 18, 1933 |
| 2,040,114 | Watkins | May 12, 1936 |
| 2,208,474 | Carroll | July 16, 1940 |
| 2,247,787 | Schmidt | July 1, 1941 |
| 2,308,039 | Ashlock, Jr. | Jan. 12, 1943 |
| 2,413,861 | Carroll | Jan. 7, 1947 |

FOREIGN PATENTS

| Number | Country | Date |
|---|---|---|
| 625,009 | France | Apr. 19, 1927 |